Aug. 9, 1932.    E. S. PURINGTON    1,870,745
SYNCHRONIZATION FOR FACSIMILE TRANSMISSION
Filed May 18, 1929
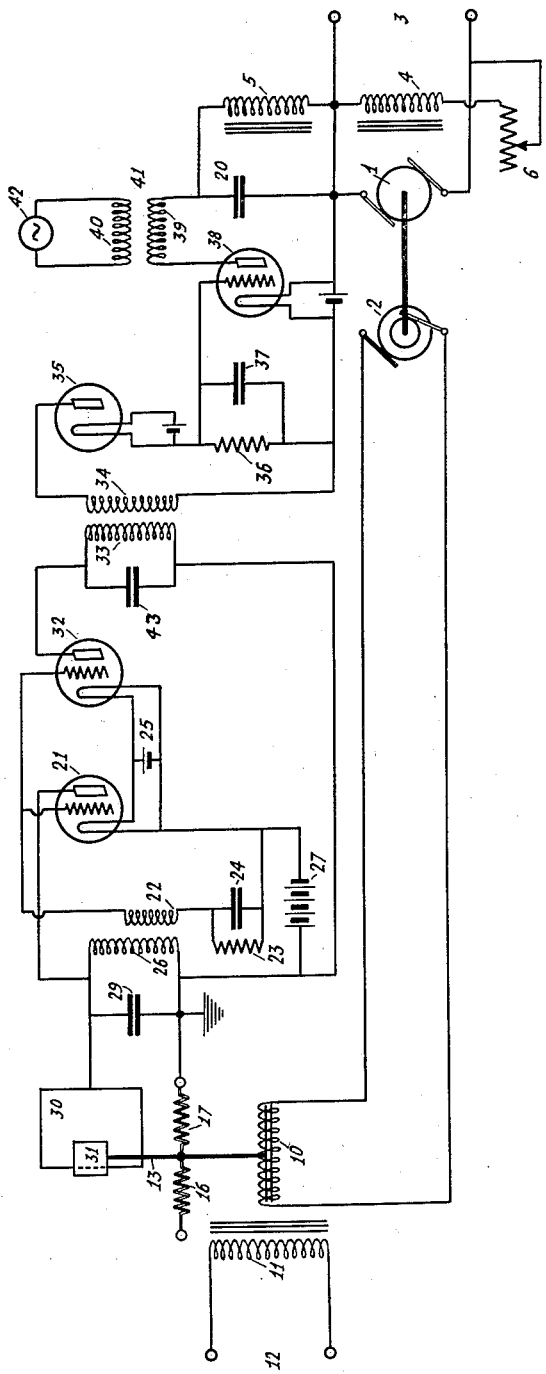
INVENTOR
ELLISON S. PURINGTON
BY
ATTORNEY Patented Aug. 9, 1932

1,870,745

UNITED STATES PATENT OFFICE

ELLISON S. PURINGTON, OF GLOUCESTER, MASSACHUSETTS, ASSIGNOR TO JOHN HAYS HAMMOND, JR.

SYNCHRONIZATION FOR FACSIMILE TRANSMISSION

Application filed May 18, 1929. Serial No. 364,223.

The present invention relates broadly to synchronizing means and more particularly to such means for use in facsimile, television and the like signalling systems.

In the transmission of facsimile, television, etc., it is necessary to have a moving rotary member, at the receiver, synchronized in its rotation with a similar rotary member, at the transmitter. Various means have been employed in an attempt to perfect the mechanism for accomplishing the synchronism between these two rotary elements.

It is an object of this invention to permit more nearly perfect synchronism between the rotary elements at the transmitter and receiver.

It is a further object of this invention to drive a rotary element in accordance with controlling master oscillations.

It is more specifically the object of this invention to drive a rotary element in accordance with impulses received from the transmitter.

A still further object of this invention is to provide a synchronizing arrangement which permits synchronization without the use of contacts.

It is another object of this invention to synchronize by using the phase relationship of the generated and controlled synchronizing frequencies rather than the amplitudes of the two frequencies.

With the present method of synchronization for signals, utilizing impulses transmitted from the transmitter, absolute accuracy in the speed of the rotary member at the transmitter is not so important, as variations of from one to two percent, in the speed of the rotary element in the transmitter will be taken care of by a similar variation in speed at the receiver, so that the result will be practically unaffected by the original variations.

This arrangement for synchronizing without contacts utilizes the action between the current produced by the rotating machine, the speed of which it is desired to accurately control, and the current received from a standard source, or preferably the frequency received from the transmitter. This has the advantage of the synchronization not depending upon the amplitude of the pulsating current to the same degree as in other arrangements, and is therefore especially applicable to synchronization of the received radio impulses.

For further preventing variation in the received radio signal, affecting the synchronization, a compensating arrangement may be used as disclosed in Patent No. 1,795,616, issued March 10, 1931.

In accomplishing the objects of this invention, a phase operated device is provided, the pulsating controlling current being fed to one of the windings of the device, preferably a stator winding, and the pulsating current produced by the rotating machine, the rotation of which is to be controlled, being fed to the other winding of the relay, preferably the armature winding. The displacement of the armature relative to the stationary winding due to the change in the phase of the current produced by the generator relative to that of the controlling current, causes the relay to operate to increase or decrease the speed of the driving motor by an appropriate amount to correct the phase displacement.

To entirely eliminate contacts, this device is used, for instance, to move a condenser plate to increase or decrease the frequency of an oscillator for a rather high frequency of, say, anywhere from 10,000 to 1,000,000 cycles. These oscillations may be amplified and there will be thus produced a current the frequency of which is varied by the position of the armature. A selective circuit is provided, and by means of rectification a bias may be provided or a high power rectifier, the amount of which will vary in accordance with the position of the relay armature. The power developed by the power amplifier may be used to supply current to the auxiliary field of the driving motor and thus control its speed in accordance with the frequency generated by the oscillator or the position of the relay armature.

Having thus briefly described my invention, attention is invited to the drawing in which the figure represents the circuit for accomplishing my invention.

In carrying out my invention, there is provided a motor 1 operatively connected to an alternating current generator 2. The current for the motor may be D. C. and supplied through the leads 3. The field of the motor is shown as a shunt field 4 and the field current is controlled by the usual rheostat 6. For varying the speed of the motor in accordance with the controlling action, there is provided an auxiliary field 5, the current through which is caused to vary to control the motor, as will be more clearly set forth hereinafter.

The synchronizing impulses, which are produced by the rotating machine at the transmitter, transmitted and received in the receiver are supplied to the synchronizing device through the connections 12 and serve to energize the stator winding 11 of the phase operated device. The current, from the machine the speed of which it is desired to control, or in this instance produced by the alternator 2, is fed to the armature winding 10. The armature winding 10 is mounted on a core which has a condenser plate supporting arm 13 and the motion of the armature and arm is damped by means of springs 16 and 17.

For producing the auxiliary high frequency oscillations, there is provided an oscillator 21, of the usual thermionic type, having its filament supplied by the low voltage power source 25. The grid circuit of the oscillator comprises the inductance 22, the biasing resistor 23, and the bypass condenser 24, and the plate circuit of the oscillator comprises the inductance 26 which is inductively related to the said inductance 22, and, for determining the frequency of the oscillations produced, the condenser 29, and the high potential source 27. For varying the frequency produced by the oscillator, there is provided in parallel with the condenser 29 the auxiliary condenser composed of a stationary plate 30 and a moving plate 31, the latter of which is mounted upon the condenser plate supporting arm 13 and is thus actuated by the motion of the phase operated device.

The high frequency produced by the oscillator 21 is supplied to the grid of the amplifier device 32, the latter of which has a tuned output circuit composed of the inductance 33 and condenser 43 which therefore serves to selectively amplify the frequency produced by the oscillator 21. Inductively related to the last mentioned inductance 33, is the inductance 34 in the circuit of the rectifier 35 shown in this instance as a two electrode thermionic device. Also included in the circuit of the rectifier is a biasing resistor 36 which, being in the grid circuit of the power amplifier 38, serves to increase or decrease the grid bias upon the grid of the power amplifier, and thereby the amount of current which will exist in its plate circuit. For bypassing the high frequencies in the grid circuit of the power amplifier device 38 there is provided the bypass condenser 37. For supplying the high voltage potential to the power amplifier circuit, there is provided in the plate circuit of the said device an inductance 39 inductively coupled to the inductance 40 which is supplied by the generator 42 with an alternating current potential.

The rectified current in the plate circuit of the power amplifier 38 passes through the auxiliary field winding 5 of the motor 1, and serves to augment the total field current of the said motor by a greater or less degree, in accordance with the frequency being generated by the generator 21 as controlled by the position of the armature 13 and the consequent capacity between the plates 30 and 31. For preventing high frequency currents existing in the plate circuit of the power amplifier 38 from passing through the auxiliary field 5 there is provided a bypass condenser 20.

Having thus described my invention, I will briefly describe its operation.

The generator 21 generates a high frequency energy the frequency of which is controlled in accordance with the position of the moving plate 31 with respect to the stationary plate 30. The frequency of the oscillations is therefore controlled by the phase relationship between the received frequency as existing in the winding 11 of the phase operated relay and the locally generated frequency as produced by the generator 2 operated by the motor 1 as existing in the armature winding 10 of the said phase operated device. The amplifier 32 serves to selectively amplify the frequency produced by the generator 21 and this energy is rectified in the rectifier 35, serving to vary the flow of current through the grid resistor 36 and consequently the bias on the grid of the power amplifier device 38. The amount of current supplied by the generator 42 is rectified by the power amplifier device 38 and controlled by the bias or grid of the said power amplifier 38 which, as above noted, is controlled by the amount of energy rectified by the rectifier 35. The current flowing through the auxiliary field winding 5 is thus controlled by the energy rectified by the power amplifier 38, or, in accordance with the phase displacement between the locally generated and received impulses, and the motor 1 which is connected to drive some element used in the reception of facsimile or television, is thus controlled in its speed in accordance with the received impulses. The rough speed adjustment of the motor 1 is made in the usual manner by the field rheostat 6, the residual speed fluctuations being taken care of by the circuits just described.

Having thus described my invention, it is to be understood that various modifications are possible within its scope, that shown and described herein being for the purpose of illustration only, and that I am therefore not to be limited by the specific form shown and described, but by the scope of my invention as defined in the following claims:

I claim:

1. Means for producing synchronous rotation which comprises, a motor including a shunt field and an auxiliary field, an alternating current generator adapted to be driven by said motor and to produce an alternating current, a source of alternating current of the same frequency as the normal frequency of the alternating current produced by said alternator for synchronizing the speed of rotation of said motor, a phase controlled device adapted to be operated in accordance with phase displacements between the current derived from said alternating current generator and current derived from said source of alternating current, a high frequency generator, a variable condenser for varying the frequency of the oscillations produced by said high frequency generator, said variable condenser being adapted to be operated by said phase controlled device, a selective circuit for transmitting said frequency varied high frequency energy, a rectifier for rectifying said selectively transmitted frequency varied high frequency energy, a source of low frequency alternating current, a power amplifier for rectifying said low frequency current, an input circuit for varying the amount of the rectification of said low frequency current in accordance with the rectified selective transmitted frequency high frequency current, said rectified low frequency current being adapted to supply the auxiliary field of said motor thus varying its speed of rotation.

2. Means for producing synchronous rotation which comprises, a direct current motor, an alternating current alternator operatively related thereto and a controlling alternating current, means for comparing the phase of the current generated by said alternating current generator and the controlling alternating current, including a stator winding and an armature winding, each of which is adapted to be excited by one of said alternating currents, means for producing high frequency energy, means for varying the frequency of said high frequency energy in accordance with the position of said armature winding, an auxiliary field for said direct current motor, means for supplying current to said auxiliary field, the intensity of which is varied in accordance with the frequency of said high frequency oscillations and consequently by the phase relationship between said locally produced alternating current and said controlling alternating current.

3. Means for the control of rotary motion for television, facsimile reproduction, and the like, which comprises, a direct current motor adapted to drive a rotary member the speed of which must be accurately controlled, an alternating current generator operatively connected to said motor, means for receiving a controlling alternating current having a frequency related to the speed of rotation of a rotary member with which the first mentioned rotary member is to be synchronized, a phase operated device comprising a stator winding adapted to be excited by the received alternating current, an armature winding adapted to be excited by the locally generated alternating current, and means for controlling the speed of said motor in accordance with the phase relationship between the currents in said stator and armature windings comprising a source of high frequency, means for controlling the frequency of said high frequency in accordance with said phase relationship, and means for controlling the speed of the direct current motor in accordance with the frequency of said high frequency.

4. Means for the control of rotation for television, facsimile reproduction, etc., which comprises, a variable speed direct current motor, means operated by said motor for producing an alternating current, a source of similar controlling alternating current, means for receiving said similar alternating current and controlling the speed of rotation of said motor comprising a phase operated device having one winding adapted to be excited by the received alternating current and a second winding adapted to be excited by the locally generated current, a source of high frequency, a condenser adapted to control the frequency of said high frequency and adapted to be operated by said phase operated device, and means whereby the speed of said direct current motor may be controlled by the frequency of said high frequency.

5. The method of synchronizing one rotary member with another rotary member which comprises, generating an alternating current having a frequency which is directly related to the speed of rotation of the first rotary member, generating a controlling alternating current having a frequency directly related to the speed of rotation of the other rotary member, comparing the two generated alternating currents, generating a high frequency current, varying the frequency of said high frequency current in accordance with the phase displacement of the currents being compared, and varying the speed of the first rotary member in accordance with variations in the frequency of the high frequency current being generated.

6. The method of controlling the speed of rotation of a rotary device for use in television, facsimile reproduction, etc., which comprises, generating an alternating current having a frequency directly proportional to the speed of the rotating device, comparing said alternating current with a standard frequency alternating current, generating a high frequency, varying the frequency of said high frequency in accordance with a displacement of the currents being compared, selectively amplifying said high frequency thus varied and utilizing said amplified high frequency to control the speed of rotation of said rotating device.

7. The method of maintaining synchronism between sending and receiving members in television, facsimile reproduction systems and the like which comprises generating an alternating current having a frequency directly related to the speed of the sending member, generating a like second alternating current having a frequency directly related to the speed of the receiving member, transmitting said first current from the sending member to the receiving member, comparing said two currents, generating an auxiliary high frequency current at the receiving member, varying the frequency of said high frequency current in accordance with a phase displacement of the two currents being compared and controlling the speed of the receiving member in accordance with the frequency of said generated high frequency energy.

8. In a system for maintaining synchronism between sending and receiving members in television, facsimile reproduction systems, and the like, means for generating an alternating current having a frequency directly proportional to the speed of rotation of the receiving member, a source of alternating current having a frequency proportional to the speed of rotation of the sending member, means for comparing the phase of said first named current with the phase of said second named current, a source of high frequency current, means controlled by said phase comparing means for varying the frequency of said last named high frequency current in accordance with differences in phase of the currents being compared for controlling the speed of the receiving member.

9. In an arrangement for maintaining the speed of rotation of a rotating device for use at the receiving point in television, facsimile reproduction systems and the like in synchronism with a rotating device at a transmission point, a source of standard frequency energy, means for generating an alternating current by the rotation of the receiving point rotating device, means for receiving said standard frequency energy, means for comparing the phase of said alternating current with the phase of said standard frequency energy, means for producing a high frequency current, means for varying the frequency of said high frequency current in accordance with the phase displacement of the currents being compared, means for selectively amplifying said high frequency current thus varied and means controlled by said amplified high frequency to control the speed of rotation of said receiving point rotating device.

10. In a system for maintaining synchronism between sending and receiving members in television, facsimile reproduction systems and the like, a motor field, an auxiliary motor field, an alternating current generator adapted to be driven by said motor for producing an alternating current having a frequency proportional to the speed of rotation of said motor, a source of standard frequency alternating current, a phase controlled device adapted to be operated in accordance with the phase differences between said first named alternating current and standard frequency alternating current, a high frequency generator, variable means for varying the frequency of oscillations produced by said high frequency generator, said variable means being adapted to be operated by said phase controlled device, a selective circuit for transmitting said frequency varied high frequency energy, a rectifier for rectifying said selectively transmitted frequency varied high frequency energy, a relay comprising a space discharge device having an input and an output circuit, a source of low frequency alternating current adapted to impress alternating current upon said output circuit, means in said input circuit controlled by the rectified energy for controlling the resistance of said output circuit whereby the current flow therein caused by said low frequency alternating current is controlled in accordance with the intensity of said rectified current, and means controlled thereby for varying said auxiliary motor field whereby the speed of said motor may be varied.

ELLISON S. PURINGTON.